United States Patent
Miller et al.

(10) Patent No.: US 10,589,500 B2
(45) Date of Patent: Mar. 17, 2020

(54) CUSTOMIZED AND SELECTIVE DECORATION OF INTERNAL TUBE-LIKE SURFACES USING PRE-PRINTED FILMS WITH SPLINTER RESISTANT PROPERTY

(71) Applicant: CORNING INCORPORATED, Corning, NY (US)

(72) Inventors: Jeffrey Allen Miller, Elmira, NY (US); John Charles Speeckaert, Painted Post, NY (US); Haregewine Tadesse Woldegiworgis, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 242 days.

(21) Appl. No.: 15/052,935

(22) Filed: Feb. 25, 2016

(65) Prior Publication Data
US 2016/0250837 A1   Sep. 1, 2016

Related U.S. Application Data

(60) Provisional application No. 62/121,712, filed on Feb. 27, 2015.

(51) Int. Cl.
*B32B 37/10* (2006.01)
*B32B 37/12* (2006.01)
(Continued)

(52) U.S. Cl.
CPC ............... *B32B 37/10* (2013.01); *B32B 1/08* (2013.01); *B32B 7/12* (2013.01); *B32B 9/005* (2013.01); *B32B 9/045* (2013.01); *B32B 17/064* (2013.01); *B32B 27/08* (2013.01); *B32B 27/308* (2013.01); *B32B 27/36* (2013.01); *B32B 27/365* (2013.01); *B32B 37/1009* (2013.01); *B32B 37/1018* (2013.01); *B32B 37/12* (2013.01); *B29C 63/0017* (2013.01); *B29C 63/341* (2013.01); *B32B 2250/02* (2013.01); *B32B 2270/00* (2013.01); *B32B 2307/202* (2013.01); *B32B 2307/4023* (2013.01); *B32B 2307/412* (2013.01); *B32B 2307/5825* (2013.01); *B32B 2367/00* (2013.01); *B32B 2451/00* (2013.01); *B32B 2457/00* (2013.01); *B32B 2597/00* (2013.01)

(58) Field of Classification Search
CPC . B29C 63/34–348; B29C 63/30; B29C 63/28; B29C 63/36; B29C 63/26; B29C 63/42; B44C 5/005
USPC .................................................. 156/293, 294
See application file for complete search history.

(56) References Cited

U.S. PATENT DOCUMENTS 716,759 A * 12/1902 Richardson ............... G09F 3/04
                                                              215/12.1
2,222,611 A * 11/1940 Freeman .................. B29C 63/18
                                                              156/293

(Continued)

FOREIGN PATENT DOCUMENTS

| CN | 1077041 | 1/2002 |
| WO | 2003002347 | 1/2003 |

*Primary Examiner* — Scott W Dodds
(74) *Attorney, Agent, or Firm* — Gregory V. Bean

(57) ABSTRACT

Methods and systems of customized and selective decoration of internal tube-like surfaces using pre-printed films with splinter resistant property are described. The method of adhering a film to an internal surface of a tube-like structure. The structure may have a hollow interior defined by the internal surface. The method may be carried out by providing a pre-printed film comprising first and second sides and an adhesive layer adhered to at least a portion of the first side. The pre-printed film may be positioned at least partially within the hollow interior with the adhesive layer positioned adjacent to the internal surface of the tube-like structure. The adhesive layer may be adhered to the internal surface of the tube-like structure.

2 Claims, 4 Drawing Sheets

(51) Int. Cl.
  *B32B 27/36* (2006.01)
  *B32B 7/12* (2006.01)
  *B32B 9/04* (2006.01)
  *B32B 27/30* (2006.01)
  *B32B 1/08* (2006.01)
  *B32B 9/00* (2006.01)
  *B32B 27/08* (2006.01)
  *B32B 17/06* (2006.01)
  *B29C 63/34* (2006.01)
  *B29C 63/00* (2006.01)

(56) References Cited

U.S. PATENT DOCUMENTS

| | | | |
|---|---|---|---|
| 3,488,305 A * | 1/1970 | Siconolfi | C08G 63/6828 138/178 |
| 3,976,414 A * | 8/1976 | Hegler | B29C 47/0023 425/131.1 |
| 4,029,006 A * | 6/1977 | Mercer | B41J 2/01 101/35 |
| 4,202,531 A * | 5/1980 | Hamrick | B29C 63/36 254/134.4 |
| 4,667,594 A | 5/1987 | Eddy | |
| 5,119,617 A * | 6/1992 | Mojden | B65B 35/54 53/202 |
| 5,172,980 A * | 12/1992 | Provost | A44B 18/00 383/204 |
| 5,429,702 A * | 7/1995 | Grooms | B05B 11/0045 156/156 |
| 5,937,554 A * | 8/1999 | Haugk | B05B 11/0005 40/310 |
| 6,283,022 B1 | 9/2001 | Kamen et al. | |
| 8,773,848 B2 | 7/2014 | Russell-Clarke et al. | |
| 2004/0037988 A1* | 2/2004 | Trivelli | B29C 63/343 428/36.91 |
| 2006/0254707 A1 | 11/2006 | Iandoli | |
| 2014/0000747 A1 | 1/2014 | Lasarov et al. | |

\* cited by examiner

CUSTOMIZED AND SELECTIVE DECORATION OF INTERNAL TUBE-LIKE SURFACES USING PRE-PRINTED FILMS WITH SPLINTER RESISTANT PROPERTY

This application claims the benefit of priority under 35 U.S.C. § 119 of U.S. Provisional Application Ser. No. 62/121,712 filed on Feb. 27, 2015 the content of which is relied upon and incorporated herein by reference in its entirety.

BACKGROUND

The disclosure relates to systems and methods for printing or decorating electronics, and more particularly to systems, such as a customized and selective decoration of internal tube-like surfaces of three-dimensional electronic housing using pre-printed films with splinter resistant property, and methods of adhering a film to an internal surface of a tube-like structure.

SUMMARY

The present disclosure relates, in various embodiments, to a method of adhering a film to an internal surface of a tube-like structure. The tube-like structure may have a hollow interior defined by the internal surface. The method may be useful in manufacturing a sleeve for electronics. The method may be carried out by providing a pre-printed film comprising first and second sides and an adhesive layer adhered to at least a portion of the first side. The pre-printed film may be positioned at least partially within the hollow interior with the adhesive layer positioned adjacent to the internal surface of the tube-like structure. The adhesive layer may be adhered to the internal surface of the tube-like structure.

The present disclosure also relates, in various embodiments, to an electronic housing. The electronic housing may include a tube-like structure and a film, such as a pre-printed film. The tube-like structure may have internal and external surfaces. The film may include first, second sides and an adhesive layer adhered to at least a portion of the first side and the internal surface of the tube-like structure.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

Figure 1:
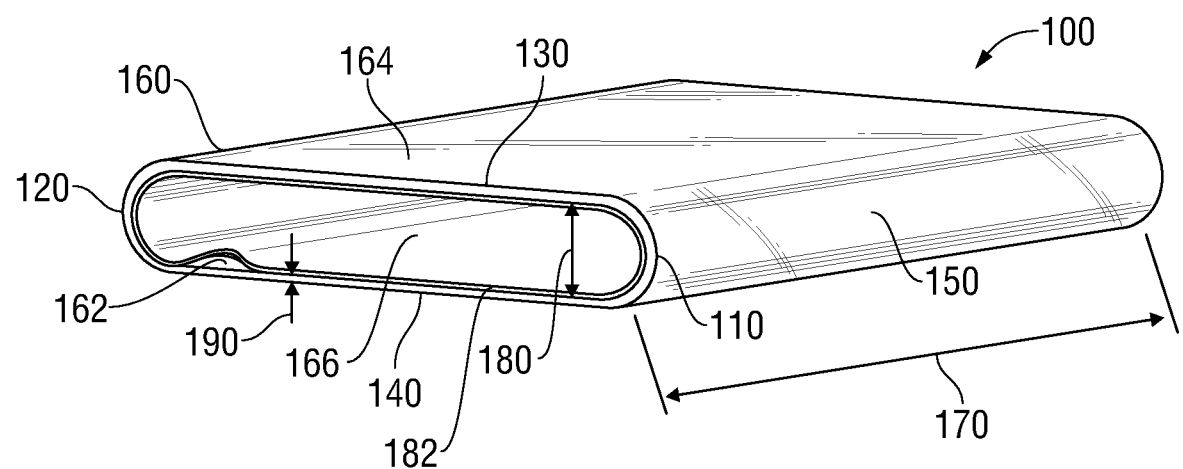
FIG. 1 is a perspective view of an electronic housing with a film attached to the internal surface of the electronic housing according to an embodiment.

The following reference characters are used in this description and the accompanying drawing figures.

| | |
|---|---|
| 100 | tube-like structure/glass sleeve |
| 110 | One edge of glass sleeve 100 |
| 120 | Another edge of glass sleeve 100 |
| 130 | First flat face |
| 140 | Second opposed generally flat face |
| 160 | Tube-like wall of glass sleeve 100 |
| 162 | Internal surface |
| 164 | External surface |
| 166 | Hollow interior |
| 170 | length of a glass sleeve |
| 180 | Internal opening |
| 182 | A film |
| 190 | Glass thickness |
| 210 | First side of the film 182 |
| 220 | Second side of the film 182 |
| 230 | A second layer |
| 232 | Adhesive layer |
| 240 | A first layer |
| 250 | A third layer |
| 300 | A method of adhering a film to an internal surface of a tube-like structure |
| 310 | A first step |
| 320 | A second step |
| 330 | A third step |
| 410 | A porous sleeve |
| 430 | A carrier |
| 450 | An open end of the tube-like structure |
| 500 | Air curtain |
| 610 | A supporting rod |
| 620 | A rolling rod |
| 710 | A first key |
| 720 | A second key |

DETAILED DESCRIPTION

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the disclosure is provided as an enabling teaching of the disclosure in its currently known embodiments. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Disclosed are materials, compounds, compositions, and components that can be used for, can be used in conjunction with, can be used in preparation for, or are embodiments of the disclosed method and compositions. These and other materials are disclosed herein, and it is understood that, when combinations, subsets, interactions, groups, etc. of these materials are disclosed, while specific reference of each various individual and collective combinations and permutation of these compounds may not be explicitly disclosed, each is specifically contemplated and described herein.

Reference will now be made in detail to the present preferred embodiment(s), examples of which are illustrated in the accompanying drawings. The use of a particular reference character in the respective views indicates the same or like parts.

As noted above, broadly, this disclosure teaches a process to decorate internal tube-like surfaces of a three-dimensional electronic housing. The method is applicable to any shaped glass, and is particularly useful for three-dimensional shaped parts, for example, for tubes and sleeves. Tube-like structures made out of glass, transparent ceramic, and transparent plastic materials may be applicable as next generation electronic housings.

"Hollow-like" and "tube-like" structures are synonymous in the present disclosure, and each is defined for purposes of the present disclosure as including a conventionally understood hollow or tube-like structure, which for example may have a cylindrical wall with a round, oval, flattened, rectangular, or other cross-section completely surrounding an internal space, and also including a wall with a cross section, for example a C-shaped cross section, partially but not fully surrounding the corresponding cross-section of the hollow or interior space. "Hollow-like" and "tube-like" structure also include a structure in which a wall cross-section encircles a hollow interior cross-section along a portion of the length of the structure, but a wall cross-section does not encircle the corresponding hollow interior cross-section along another portion of the length of the structure. A structure that changes in cross-sectional size or shape along its length and a structure that is tube-like along a portion of its length and not tube-like along another portion of its length also is included within the definition of "hollow-like" and "tube-like" structure.

This disclosure may present a novel selective decoration strategy by using pre-printed films that may have anti-splinter, anti-shatter films that make electronic covers or displays more splinter-resistant. The pre-printed films may be transferred selectively to the inside part of the tubular structure. Some areas of the internal structure may remain clear. The optically clear splinter-resistant films may be used to cover the clear areas.

The methods provide the following advantages: the embodiments may provide a novel customized decoration process. The embodiment may enable customized decoration of the internal part of the tubular surfaces with isolated window or other areas. The approach may offer flexibility on selecting variety of designs based on color pattern or image choices, as designs may be pre-printed easily using ink-jet, screen, pad or other forms of printing technologies.

Another embodiment may use pre-printed films with splinter-resistant properties so that the invention disclosure may provide dual benefits. The benefits may include decorating the electronic enclosure as well as to add mechanical strength to the tube by adding transparent anti-splinter films to the pre-print material.

The embodiment may provide a robust and multiple approaches of transferring pre-printed films. The process may be rapid and simple. The embodiment may include several and alternative methods of transferring pre-printed images to the inside a hollow-structure with anti-splinter characterization to decorate the tube-like three dimensional structure by eliminating the use of any masking and demasking processes.

The process of decoration by using pre-printed films may reduce the coating, internal masking and internal demasking time required in the process significantly. The process may also eliminate injection of wet-ink inside the tube, and removal of excess ink from the inside the tube.

The embodiment may provide potentially uniform pre-printed design as it may be easier to control the printing outside the tube, as opposed to printing in a confined space of the tubular structure. Window and other transparent areas may be demarked clearly prior to inserting the pre-printed films inside. The common decoration challenges such as ink bumps, edge imperfections inside the tube may be easily eliminated as a more controlled pre-printed films are used to decorate.

The embodiment may help to apply precise and selective decoration of tubular structures with different internal geometries, and any three dimensional shapes for electronic housing application. The electronic enclosure tubes may be made of strong glasses, tough transparent ceramics or plastic tubes. Optically clear adhesives may be applied inside the internal structure of the tube and electronic components may be bonded with the tubular structure. Decorating patterns may be customized with variety of color selections to offer wider decoration choices.

A high level optical quality may be produced to ensure the aesthetic characteristics contemplated for such an object as well as the display functionality, for example, freedom from noticeable optical defects such as lack of clarity or presence of debris. Other preferred characteristics of the sleeves are a high level of mechanical performance (to prevent breakage) and scratch resistance. To meet these criteria, for example, a Gorilla® glass composition may be particularly well suited. (Gorilla® is a trademark of Corning Incorporated, Corning, N.Y., USA, for glass, for example cover glass or a glass touch screen display in an electronic device such as a smart phone or tablet.) Optionally in any embodiment, the process may allow production of a large number of parts at high throughput and a reasonably low cost.

As used herein, the term "sleeve" describes a three-dimensional, tube-like structure or wall having a non-circular cross section and an aspect ratio greater than 1. The aspect ratio is the ratio of the largest and smallest diameters of the cross section of the tube-like structure or wall. The aspect ratio has a minimum value of 1 by definition for a round or axisymmetric tube. The aspect ratio has a value larger than 1 for a flattened sleeve. Optionally in any embodiment, aspect ratios from about 1.5 to about 50, optionally from about 3 to about 39, optionally from about 5 to about 25, optionally from about 5 to about 15, optionally from about 7 to about 11, optionally from about 18 to about 28, are contemplated.

Generally, as illustrated in FIG. 1, an electronic housing, such as a glass sleeve 100, may be somewhat oval in shape, wherein the edges 110 and 120 are rounded. In another embodiment, the edges may be somewhat rectangular in shape or other shapes. Optionally in any embodiment, the glass sleeve 100 may have at least one face. Optionally, the glass sleeve 100 may have two opposed generally flat faces 130 and 140 that are near optically flat or optically flat. Optionally, a glass sleeve 100 or hollow tabular structure may comprise a tube-like wall 160, a length 170, an internal opening 180, and a glass thickness 190. The tube-like structure may have an internal surface 162, an external surface 164, and a hollow interior 166 defined by the internal surface 162. The tube-like structure may be closed and seamless, for example, with one end or both ends open and wall closed seamlessly. Optionally, a glass sleeve 100 can have at least one flattened portion 130 or 140 that is, or approaches being, optically flat.

Figure 2:
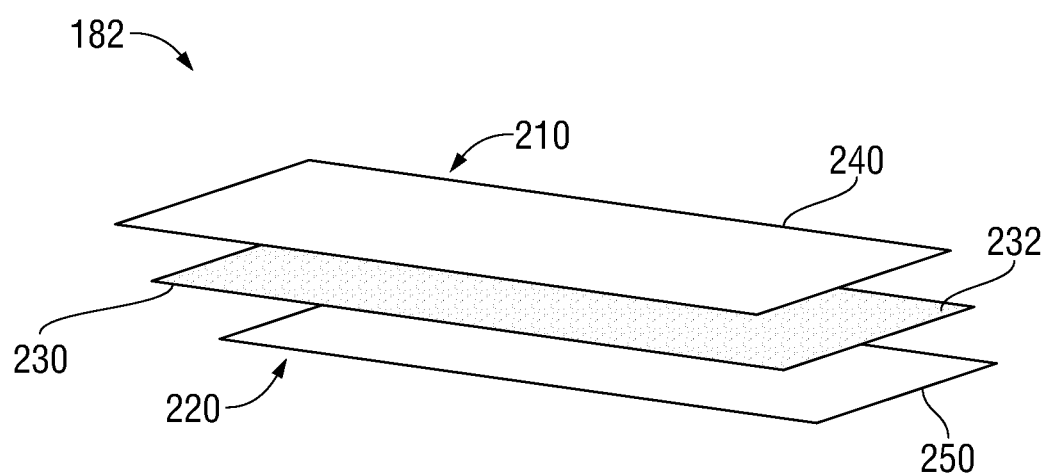
FIG. 2 is a perspective view of a printed film having a plurality of layers according to an embodiment.

The glass sleeve 100 may have a film 182. The film 182 may include a first side 210 and a second side 220 as shown in FIG. 2. The film 182 may include a first layer 240, the second layer 230, and a third layer 250, for example. The second layer 230 may include an adhesive layer 232 adhered to at least a portion of the first side 210 and the internal surface 162 of the tube-like structure. The adhesive may contain optically clear adhesive. The first layer 240 may be a pressure sensitive adhesive film that may cover the pre-printed pattern on the second layer 230. The pressure sensitive adhesive film may be disposable. The pressure sensitive adhesive film may function as a protection of the adhesive layer 232. The second layer 230 may have a customized pre-printed image. The adhesive layer 232 may be bonded to the tube-like structure, such as a glass or a ceramic tube. If the tube-like structure is transparent, any customized pre-printed image may be visible by a user.

The third layer 250 may be a base film. The base film may be flexible. In one embodiment, the base film may include an anti-splinter material. The anti-splinter material may be at least one of a polycarbonate, a polyethylene terephthalate (PET), polyester, transflective, or an acrylic material. In another embodiment, the anti-splinter materials, optically clear adhesive, or other independent conductive or semi-conductive films may be incorporated into the adhesive layer 232 on the second layer 230. In yet another embodiment, the additional properties, such as anti-microbial, anti-glare, anti-reflective materials may be present in the tube-like structure. The conductive or semi-conductive layers may include a transparent conductive oxide, a conductive polymer, an organic light-emitting diode, or a combination of any two or more of these, for example. The organic light-emitting diode (OLED) may be polyanilines, polyacetylene, polypyrrole and the like. Most used organic light-emitting diode materials may include Poly(3,4-ethylenedioxythiophene) (PEDOT), Poly(3,4-ethylenedioxythiophene) (PEDOT): poly(styrene sulfonate) (PSS), Poly(4,4-dioctylcyclopentadithiophene), for example.

As used herein, the term "near optically flat or optically flat" describes an optical-grade piece of glass lapped and polished to be extremely flat on one or both sides, usually within a few millionths of an inch (about 25 nanometers).

While most of the embodiments herein are used particularly in application to sleeve glass enclosures, it is contemplated that the same method could be applied more widely, for example with an additional step of cutting the tubes in half or severing optically flat portions to provide for a 3D shaped cover glass, touch screen, or other part.

Figure 3:
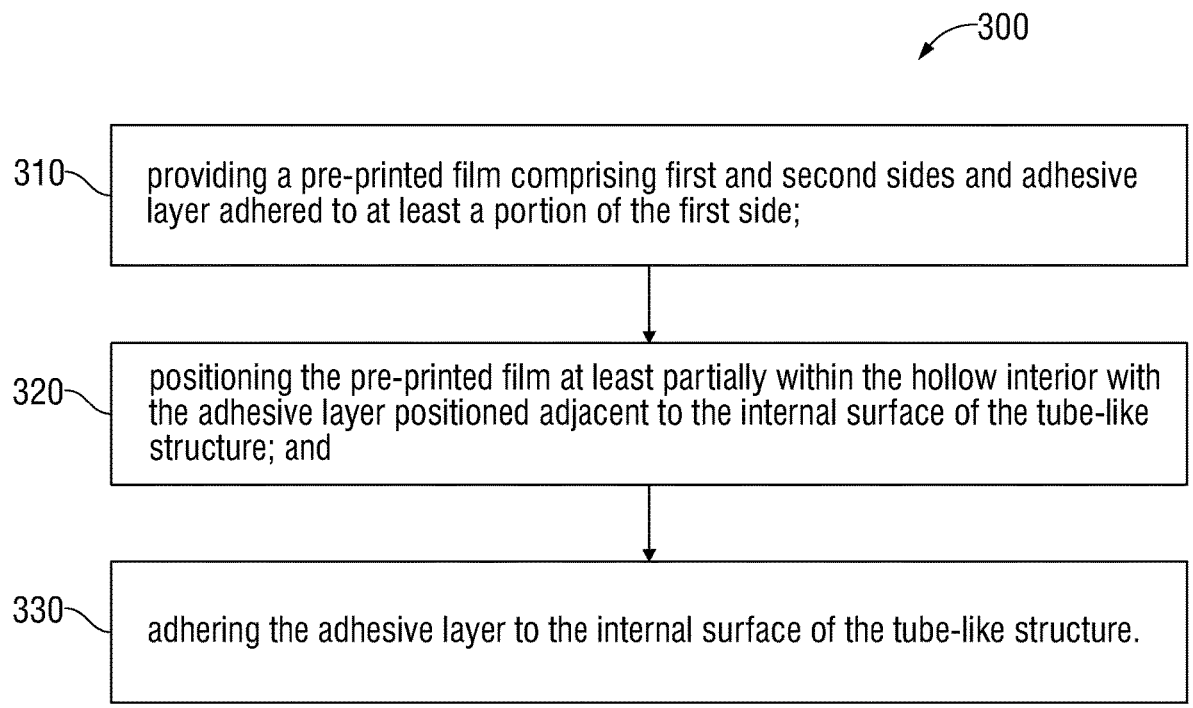
FIG. 3 is a flow chart illustrating an embodiment of a method for adhering a film to an internal surface of a tube-like structure.

As shown in FIG. 3, a method 300 may be used to adhere a film to an internal surface of a tube-like structure. The tube-like structure may have a hollow interior defined by the internal surface. The method is carried out by providing a pre-printed film comprising first and second sides and an adhesive layer adhered to at least a portion of the first side in a step 310. A pre-printed film may be positioned at least partially within the hollow interior with the adhesive layer positioned adjacent to the internal surface of the tube-like structure in a step 320. The adhesive layer may be adhered to the internal surface of the tube-like structure in a step 330.

The tube-like structure may be a glass tube. The tube may be a circular or non-circular tube-like structure. The hollow tube-like structure may have a first aspect ratio, which may be defined as a ratio between the first diameter over the second diameter at a cross-section. Optionally in any embodiment, the aspect ratio can vary along the length of the part. The film may include anti-splinter material. The anti-splinter material may be one of a polycarbonate, a polyethylene terephthalate (PET), polyester, transflective, an acrylic material or combination of two or more.

The process may start by providing a tube-like structure, such as a glass tube of the contemplated glass composition made using a traditional tubing process. Tube-like structures made out of strong glass, transparent ceramics, and tough plastics may cover electronic devices and provide competitive advantage to an existing electronic housing that is available in the market.

Pre-printed patterns may be transferred and positioned inside the tube-like structure using several approaches. Methods may vary from a seamless pre-printed sleeve-like film incorporating splinter-resistant materials to rolling of an open pre-printed film.

Figure 4:
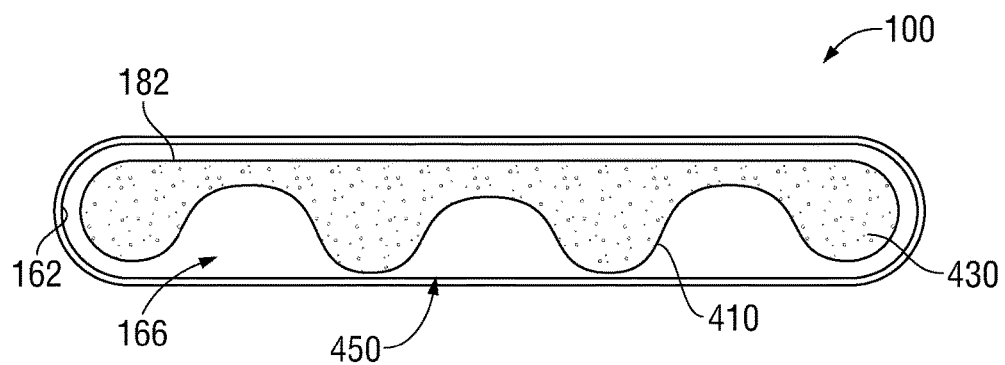
FIG. 4 is a cross-sectional view of an embodiment of a method for delivering the pre-printed film with a sleeve inside the tube-like structure.

As shown in FIG. 4, the pre-printed film 182 may have a sleeve, such as a porous sleeve 410. The porous sleeve 410, before application, may have a circumference less than the circumference of the internal surface 162 of the tube-like structure 100. The method 300 may further include stretching the circumference of the sleeve while adhering the adhesive layer to the internal surface of the tube-like structure. A carrier 430 may be used to support the pre-printed film while the sleeve is positioned within the hollow interior 166 of the tube-like structure, such as the glass sleeve 100. The carrier may have a porous skin, an interior space communicating with the porous skin, and a fluid or vacuum supply to the interior space. The tube-like structure may comprise an open end 450. The method 300 may further include advancing the pre-printed film 182 on the carrier 430 into the hollow interior 166. The fluid, such as air, may be passed into the porous skin, via the interior space, to the vacuum supply, to retain the porous sleeve 410 against the porous skin. Vacuum may be applied through the porous carrier skin to hold the pre-printed film in place. The pressure may be applied to bond the pre-printed films to the tube-like structure.

In another embodiment, the method 300 may include passing fluid, such as gas or liquid, from the fluid supply via the interior space, space through the porous skin to push the sleeve into contact with the internal surface of the tube-like structure. The method 300 may further include forming the sleeve into a balloon and inflating the balloon with the fluid supply, such as air supply.

Figure 5:
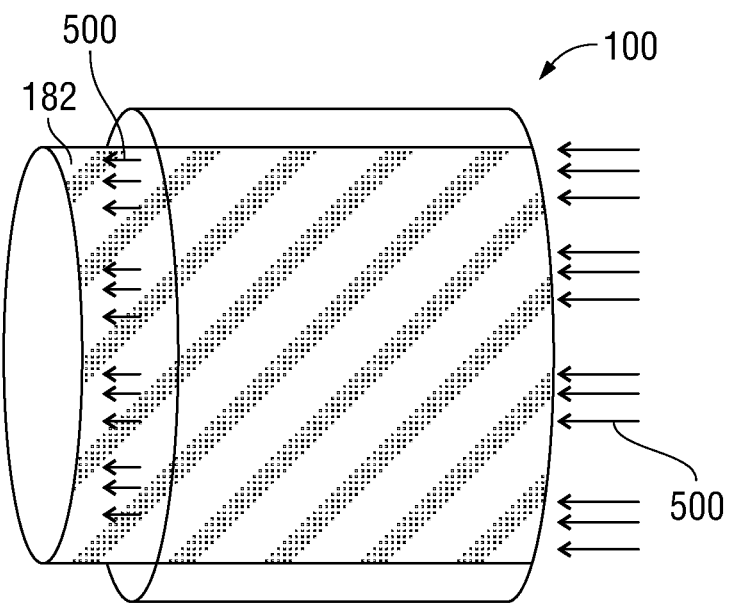
FIG. 5 is a schematic view of another embodiment of a method for inserting a pre-printed seamless film to the inside the tube-like structure.

As shown in FIG. 5, air curtain 500 may be supplied to assist insertion of the pre-printed film and inhibit bonding between the pre-printed film and glass until the pre-printed film is aligned well inside the tube-like structure. Pressure may then be applied to bond the film to the inner section of the glass.

Figure 6:
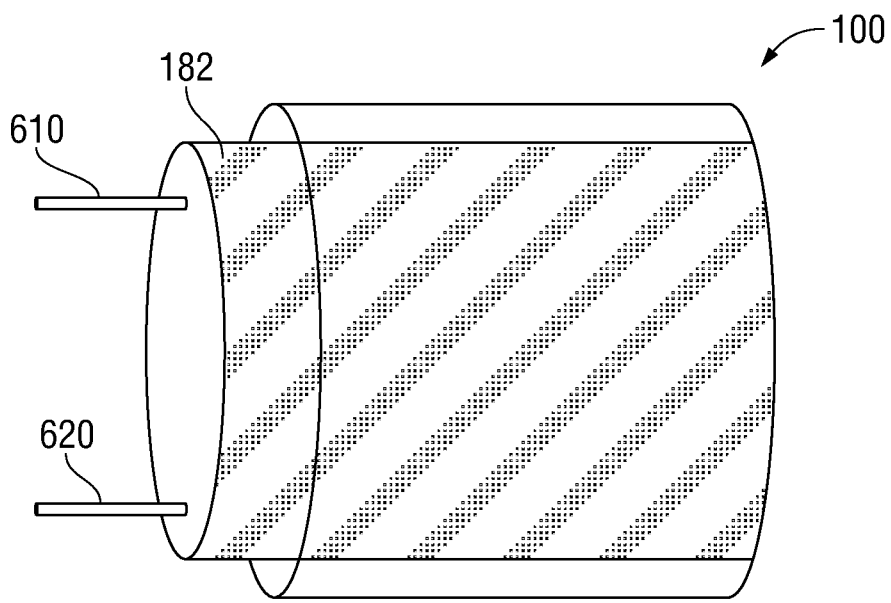
FIG. 6 is a schematic view of still another embodiment of a method for inserting a pre-printed film with a sleeve to the inside the tube-like structure.

Optionally in any embodiment, as shown in FIG. 6, the carrier may include a supporting rod 610 and a rolling rod 620. The method 300 may be carried out by rolling the adhesive layer into contact with the internal surface with the rolling rod 620. A seamless pre-printed sleeve-like film may be inserted and aligned inside with the rolling rod 620 to apply mechanical pressure for bonding. Optionally in any embodiment, the method 300 may further include wetting the sleeve with a wetting liquid. The adhesive on the sleeve-like film may be activated by the wetting liquid, such as water, once alignment is achieved. This may enable easier alignment of the pre-printed film and control on exact positioning of the pre-printed film inside the tube-like structure.

Figure 7:
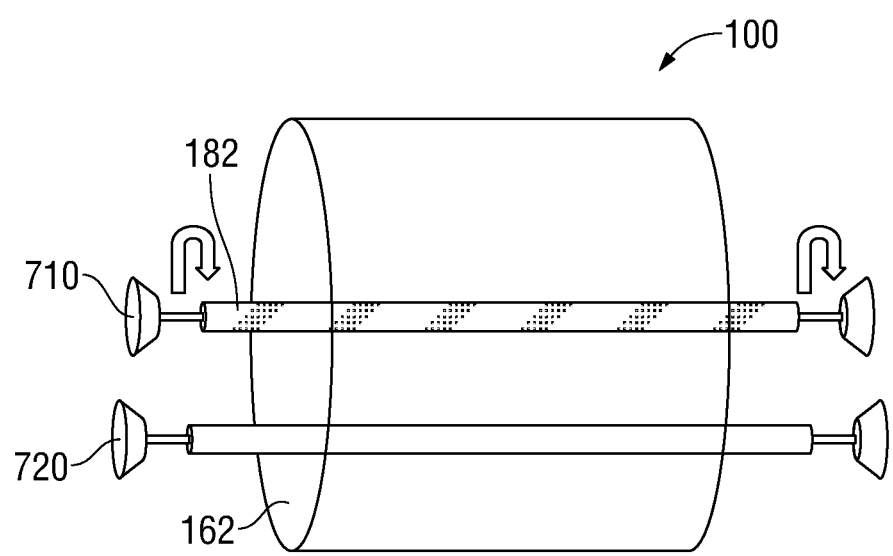
FIG. 7 is a schematic view of yet another embodiment of a method for rolling a pre-printed flat and flexible film to the inside the tube-like structure.

A rolling approach may be used for pre-printed flat and flexible films. The film may have a removable protective backing. As shown in FIG. 7, the film 182 may be provided as a roll on a first key 710. The film 182 may be adhered to the internal surface 162 of the tube-like structure by unrolling the roll and contacting the adhesive layer with the internal surface 162. The method 300 may further be carried out by peeling off the removable protective backing while or after adhering the adhesive layer on the first side of the pre-printed film to the internal surface of the tube-like structure and rolling the protecting backing onto a second key 720 within the hollow interior of the tube-like structure.

It will be apparent to those skilled in the art that the methods and apparatuses disclosed herein could be applied to a variety of structures having different geometries and to create selectively coated and uncoated portions of varying shapes, sizes, and orientations. It will also be apparent to those skilled in the art that various modifications and variations can be made without departing from the spirit or scope of the invention.

What is claimed is:

1. A method of adhering a pre-printed film to an internal surface of a glass or ceramic, transparent tube-like structure having a hollow interior defined by the internal surface, the method comprising:
    positioning a film at least partially within a hollow interior defined by an internal surface of a glass or ceramic transparent tube-like structure, the film having first and second sides and having an optically clear adhesive layer adhered to at least a portion of the first side, the adhesive layer positioned adjacent to the internal surface of the tube-like structure, the film being a pre-printed film having a pre-printed image, design, or pattern; and
adhering the adhesive layer to the internal surface of the tube-like structure such that the pre-printed image, design, or pattern is visible through an external surface of the tube-like structure,
    wherein the pre-printed film comprises a sleeve and the sleeve, before application, has a circumference less than the circumference of the internal surface, the method further comprising stretching the circumference of the sleeve while adhering the adhesive layer to the internal surface of the tube-like structure.

2. A method of adhering a pre-printed film to an internal surface of a glass or ceramic, transparent tube-like structure having a hollow interior defined by the internal surface, the method comprising:
    positioning a film at least partially within a hollow interior defined by an internal surface of a glass or ceramic transparent tube-like structure, the film having first and second sides and having an optically clear adhesive layer adhered to at least a portion of the first side, the adhesive layer positioned adjacent to the internal surface of the tube-like structure, the film being a pre-printed film having a pre-printed image, design, or pattern, the pre-printed film comprising a sleeve;
    adhering the adhesive layer to the internal surface of the tube-like structure such that the pre-printed image, design, or pattern is visible through an external surface of the tube-like structure;
    supporting the pre-printed film on a carrier while positioning the pre-printed film within the hollow interior of the tube-like structure, the carrier having a porous skin, an interior space communicating with the porous skin, and a fluid supply to the interior space;
    passing fluid from the fluid supply, via the interior space, through the porous skin to push the sleeve into contact with the internal surface of the tube-like structure; and
    forming the sleeve into a balloon and inflating the balloon with the fluid supply.

\* \* \* \* \*